(12) United States Patent
Fromm

(10) Patent No.: US 9,606,424 B2
(45) Date of Patent: Mar. 28, 2017

(54) HOLDING ASSEMBLY FOR A CAMERA

(71) Applicant: Wayne Fromm, Richmond Hill (CA)

(72) Inventor: Wayne Fromm, Richmond Hill (CA)

( * ) Notice: Subject to any disclaimer, the term of this patent is extended or adjusted under 35 U.S.C. 154(b) by 0 days.

(21) Appl. No.: 14/849,113

(22) Filed: Sep. 9, 2015

(65) Prior Publication Data

US 2016/0187763 A1    Jun. 30, 2016

Related U.S. Application Data

(63) Continuation-in-part of application No. 14/588,218, filed on Dec. 31, 2014, now Pat. No. 9,386,196.

(51) Int. Cl.
*G03B 17/56* (2006.01)
*F16M 11/26* (2006.01)
*F16M 13/02* (2006.01)

(52) U.S. Cl.
CPC ........... *G03B 17/561* (2013.01); *F16M 11/26* (2013.01); *F16M 13/02* (2013.01)

(58) Field of Classification Search
CPC ....... G03B 17/561; F16M 13/02; F16M 11/26
See application file for complete search history.

(56) References Cited

U.S. PATENT DOCUMENTS

| | | | | |
|---|---|---|---|---|
| 5,538,212 A | * | 7/1996 | Kennedy | F16M 13/02 396/428 |
| 6,738,094 B1 | * | 5/2004 | Minami | H04N 5/2251 348/373 |
| 7,684,694 B2 | | 3/2010 | Fromm | |
| 8,757,901 B2 | | 6/2014 | Fromm | |
| 9,169,962 B2 | * | 10/2015 | Wang | F16M 11/14 |
| 9,217,911 B1 | * | 12/2015 | Von Winsor | G03B 17/561 |
| 2003/0081953 A1 | * | 5/2003 | Wei | G03B 17/00 396/428 |
| 2007/0292125 A1 | * | 12/2007 | Saxton | G03B 17/563 396/420 |
| 2008/0117328 A1 | | 5/2008 | Daoud et al. | |
| 2009/0010637 A1 | | 1/2009 | DeWitt | |
| 2011/0116782 A1 | | 5/2011 | Scott | |

* cited by examiner

*Primary Examiner* — Gevell Selby
(74) *Attorney, Agent, or Firm* — Vincent G. LoTempio; Kloss, Stenger & LoTempio; David T. Stephenson

(57) ABSTRACT

A holding assembly for a camera, such as a smartphone, which may be hung from a wide variety of surfaces to position the camera for taking pictures that include the camera's user. The length of a rod at which the end of the camera may be attached is adjustable to set the camera at the appropriate height. The adjustable rod has a handle at one end and may have a C-shaped hook adjacent to the handle. At the other end of the assembly is a mount for the camera. Alternatively, the holding assembly may fold open to attach the camera to one section and the support surface to another section. The holding assembly may be attached to the support surface on an upper section by a sticky gel that doesn't damage a surface and the camera may be attached to the lower section with magnets or gel.

10 Claims, 20 Drawing Sheets

HOLDING ASSEMBLY FOR A CAMERA

RELATED APPLICATIONS

This application is a continuation-in-part of application Ser. No. 14/588,218 filed on Dec. 31, 2014.

FIELD

The present disclosure relates to a holding assembly for hanging a camera on a support surface. The camera may be hung on a wide variety of surfaces and the holding assembly for the camera is easily transportable. A hook, tether or adhesive may be used as a means to temporarily mount the device on a vertical support. The device is ideal for use with smartphones and digital cameras. The design allows for easy attachment without damaging the surface on which the device is mounted.

BACKGROUND

The increase in popularity of digital cameras, particularly those incorporated into mobile phones, has given rise to a number of devices that allow a user to support the camera while also being included in a picture. Camera is defined herein as any device for taking pictures or video, such as a smartphone, digital camera and the like.

Examples of this type of hand held camera support can be seen in U.S. Pat. Nos. 7,684,694 and 8,757,901 and U.S. patent application publication number 2008/0117328. These hand held supporting devices work well for certain types of photographs, taken under particular conditions. Such devices, however, have limitations. For example, a user may wish to take a photograph from a greater distance than is practical for a hand held device. Further, a hand held device, particular when extended to greater lengths, is prone to shaking while a user is taking a picture, leading to blurring of the photograph. Further, the arm and stick are usually seen in the captured image, particularly in shots where the rod is fully extended.

A traditional device designed to overcome the limitations of hand held camera supports is the tripod. Tripods allow for stationary and stable picture taking at greater distances; however, they are generally bulky and inconvenient to carry. Further, a tripod often requires a stable or flat surface for support, which may not be available in certain locations. Additionally, a tripod takes time to set up and decreases the spontaneity which a photographer may wish to capture.

To overcome the limitations of a tripod, supports for mounting a camera on a stationary object such as a tree or post have been developed. Examples of such devices can be seen in U.S. patent application publication numbers 2009/0010637 and 2011/0116782. Most hangers currently in the marketplace have a channel through which an elongated fastener, such as a nail or pin, is inserted prior to the pin being driven into the support surface. These types of stationary support devices utilize stationary objects in the environment for supports, such as a trees and posts, to which the device is fastened.

The '637 application discloses an elongated piece to which a camera is attached. The elongated piece is mounted to a generally wooden or penetrable surface, by using penetrating members similar to pins, nails or staples. The limitations of the '637 device include potential damage to surfaces to which the device is mounted and the difficulty of forcing the penetrating member into the support surface.

The '782 application similarly discloses a device for attachment to a tree or a wooden, penetrable surface. The '782 device utilizes a screw or pin to penetrate the surface and support an elongate boom, to which a camera is attached at the end. Much the like the '637 device, the limitations of the '782 device include potential damage to a surface to which the device is mounted and the difficulty of inserting the pin into the surface. Additionally, the complexity of the '782 device requires a set-up time that could reduce the spontaneity of a picture. Further, devices like those described in the '637 and '782 applications are difficult to reposition if the photograph does not come out as planned.

Another solution known in the art designed to overcome the limitations of a tripod include attaching a double sided adhesive or hook and loop fastener strip directly to the camera. Once applied to the camera, the adhesive strip allows the camera to be attached to a vertical surface, or in the case of a hook and loop device, to the complementary hook and loop attachment strip on the vertical support surface. Attaching an adhesive strip directly to the camera, however, may leave damaging residue on the camera, even when the strip is designed to be removable.

a. Further, a camera is not flexible, so attaching a strip directly to the camera inhibits the ability of the user to mount the device on an irregular support surface. While an adhesive strip attached directly to the camera overcomes the problem of tripod inconvenience, it is clear that this approach has a number of limitations preventing it from being an effective solution to the problem that the present disclosure overcomes. For existing camera supports, use of an adhesive strip, nano suction or hook and loop fastener, does not allow the camera lens to be variably angled. A further problem with existing camera supports that use nano suction is that smartphone cases that have a nano suction back require the user to acquire a new case.

SUMMARY

In light of the problems associated with the known camera mounting devices, it is a principal object of the invention to provide a camera support that is capable of being mounted on a wide variety of surfaces. Further, the device of the present disclosure will not damage the mounting surface, and is lightweight and compact in size. The length of the device may be altered to suit the needs of the user and can be easily adjusted for positioning at eye level.

In one embodiment, one end the device is provided with removable ball-joint/camera mount assembly. This ball-joint mount assembly may receive a smartphone or another type of camera. The other end of the support is provided with a hanger, or adapter, which can be separated from the device when necessary.

The hanger may be in the form of a hook or adhesive. The hook may be a flat hook formed from sheet metal or the like. The hanger may be located adjacent a handle or grip, or, alternatively, may be located adjacent to a ball/joint assembly mounted at one end of the rigid support. Alternatively the hanger may be located adjacent to a ball-joint assembly mounted directly to a non-extendable rigid support.

A photographer could be at a party in a hotel room, in a backyard, at a tailgate party or the like and seek to be included in a selfie, a group photograph or video and also wants more background than a handheld camera would provide. This problem could be overcome by the use of a tripod, but the photographer may not have a tripod to mount the picture taking device, or a convenient surface on which to mount the tripod may not be available. In addition, a photographer may not have the time to set-up a tripod mounted device.

The solution to this problem is achieved by the present disclosure, which may include as its principal components a rigid support having variable lengths; the support having a hook at one end, and a ball-joint assembly mounted on the other end to which a camera may be affixed.

Alternatively the present invention may include a rigid support which may have different lengths, the support having a ball joint at one end which may support a picture taking device and a further ball-joint assembly at the other end to which a suspension structure may be secured.

In one embodiment of the present disclosure, the holding assembly has two sections that fold together. One section has an attachment surface for affixing the device to a support and the other section has an attachment surface for affixing the device to a camera. Each surface, or only one surface, may have a reusable and washable adhesive section, which leaves no residue on the support or camera with which it comes into contact. In addition, the camera attachment section is attached to a rigid serrated grip that contacts the support and provides additional stability to the holding assembly. Alternatively, the camera attachment section may have magnets behind the camera attachment surface to hold the camera in place.

For existing camera supports, use of an adhesive strip, nano suction or hook and loop fastener, does not allow the camera lens to be variably angled. The device of the present disclosure can be adjusted to hold its position at various angles when the joint or hinge is set with sufficient resistance. A further disadvantage of existing gel and hook and loop fasteners is that they may pick up dirt or lint. Some existing smartphone cases have a nano suction backing; however, this requires the user to acquire a new case.

For the present disclosure, when the magnet is replaced by sticky gel, the user can select either the front or rear facing lens of the smartphone. This is not practical or possible with other approaches. One embodiment of the present disclosure has two gel surfaces. When the flip case is opened, one gel surface attaches to a surface such as a tree and the other gel surface (replacing the magnet) holds the smartphone. This allows for both rear and front facing photography. The magnet apparatus can only be used effectively for front facing images as a steel plate must be attached to the back of the phone or between the smartphone and the case. However, the sticky gel can attach to the back of the phone, back of the cover, or front of the phone.

The camera shutter in the present disclosure may be triggered by a timer, remote control, a voice command, or it can be set to operate in a continuous mode. In addition, new cameras and smartphones may automatically sense the orientation and produce a right side up image for the person to use the screen display for centering.

DETAILED DESCRIPTION

Figure 1:
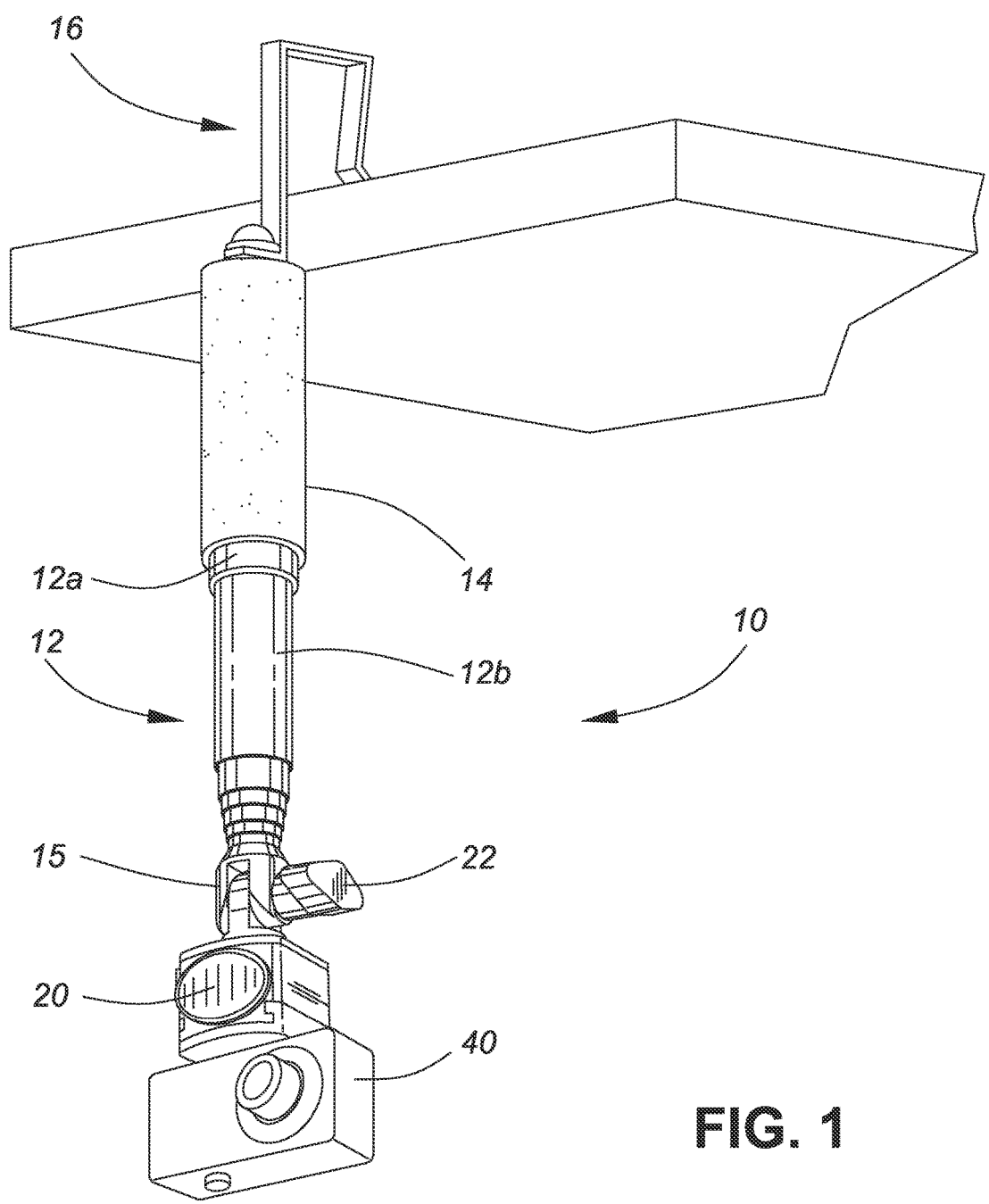
FIG. 1 is a perspective view showing the holding assembly of this disclosure when hooked to a shelf, the holding assembly including a rigid rod shown in a refracted position; the holding assembly carrying a camera secured to a ball-joint assembly and also carrying at the other end a suspension structure in the form of a hook.

With reference now to the various figures, one embodiment of the holding assembly 10 is shown in FIG. 1. Here, holding assembly 10 is shown holding a camera 40. The holding assembly 10 is preferably formed of an adjustable rigid support, which in the preferred embodiment is a telescopic rod 12, shown in FIG. 1. The telescopic rod has telescopic units 12a, 12b . . . 12n which may be locked in various positions of length adjustment. The telescopic rod has a first end distal from a second end.

As shown in FIG. 1, the first end has telescoping unit 12a, which is of the largest diameter, and is connected to a handle 14. The second end 12n is provided with removable ball-joint assembly 15. In the embodiment shown in FIG. 1 a camera 40 is secured to the ball-joint assembly 15. To attach holding assembly 10 to a generally horizontal support surface, as shown in FIG. 1, a C-shaped hook 16, which may be formed from sheet metal, plastic, or the like, may be removably attached to the handle 14 of the support 10 by a screw or attachment means known to one of skill in the art.

Figure 2:
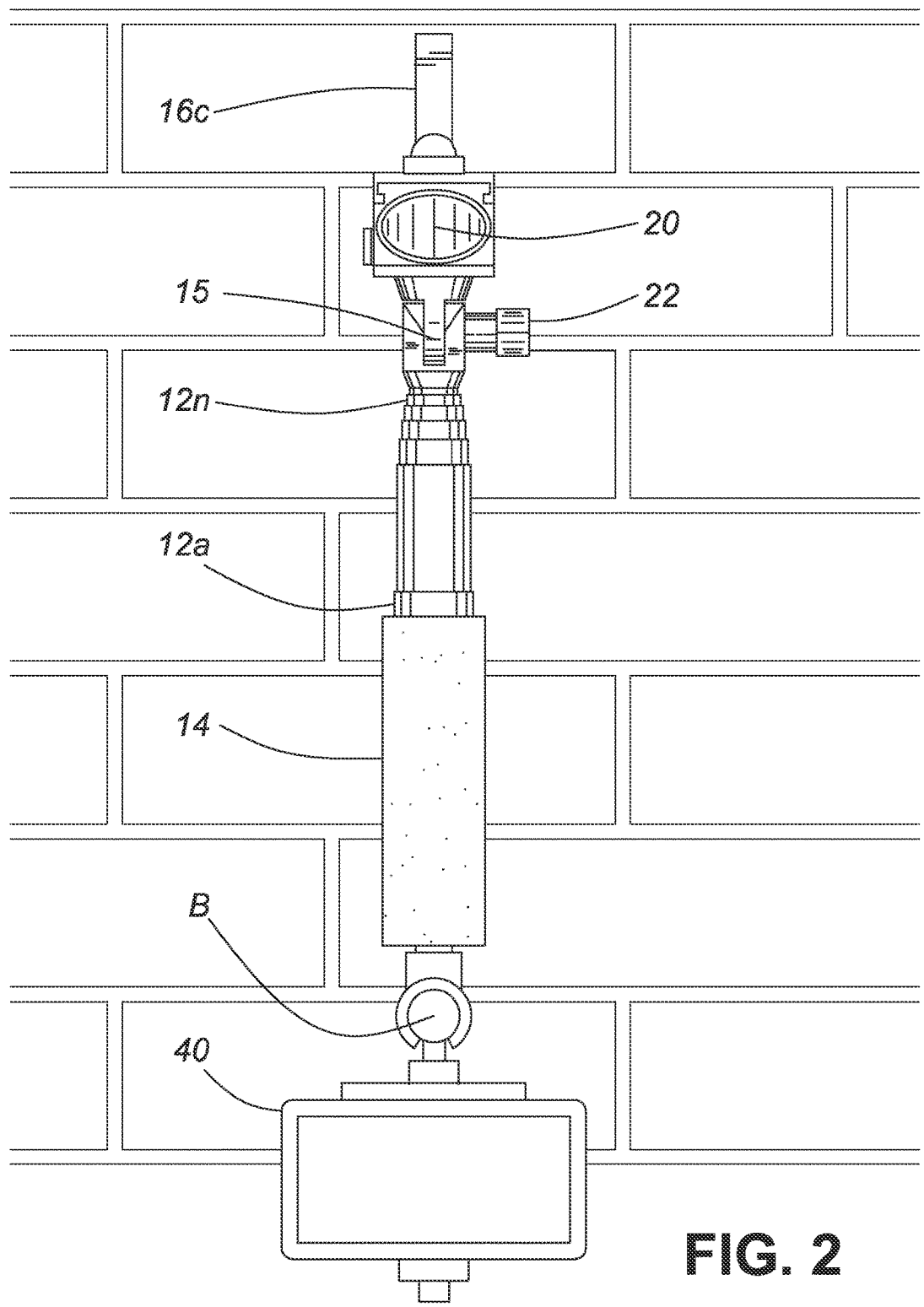
FIG. 2 is a front view showing the holding assembly hung from the top surface of a brick in a brick wall; the holding assembly being in a substantially retracted position and carrying a smartphone. In this view the ball-joint assembly is secured adjacent the handle, and the suspension structure being carried by a further ball-joint assembly adjacent the other end.

Alternatively, the C-shaped hook 16 may be secured to the ball-joint assembly 15 as shown in FIG. 2. The C-shaped hook 16 has a first vertically extending section 16a provided with a lower horizontal tab portion 16b which may be secured to the first end of the rigid telescoping sections which first end will become the upper end when the support is placed in its normal operating position. A ball-joint B may be used to attach camera mount to telescopic rod 12.

Figure 3:
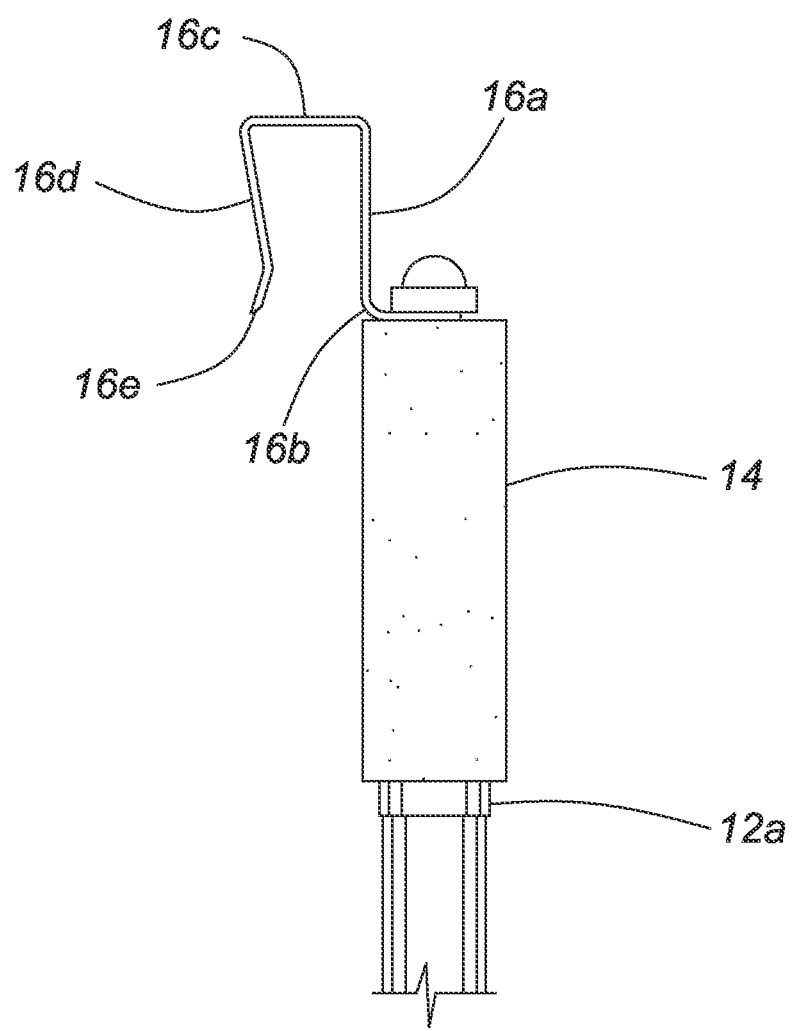
FIG. 3 is a side view of a portion of the holding assembly shown in FIG. 1 showing the hook.

As shown in FIG. 3, the C-shaped hook 16 is also provided with an upper transverse section 16c, and a downwardly extending section 16d secured to the upper transverse section and spaced away from the and generally parallel to the vertically extending section 16a. The downwardly extending section 16d is provided with an elongated lower contact surface 16e which is angled toward the support when in the normal operating position as shown in FIG. 3.

Elongated lower contact surface 16e may be placed on virtually any horizontal structure to hold the support of the device of the present disclosure. The tail of the hook in elongated lower contact surface 16e is very important; where narrower shapes are more effective, as elongated lower contact surface 16e has to grip mortar on brick walls and behind narrow spaces, and thus lower contact surface 16e may have a chisel shape.

In the embodiment show in FIG. 2 the handle 14 is used to grip the holding assembly, pushing the apparatus skyward and unhooking it from the overhead support surface. In the embodiment of FIG. 1, the camera 40 or the ball-joint assembly 15 is grasped by the user to push the holding assembly 10 upwardly to release the C-shaped hook 16 from the surface to which it is engaged.

FIG. 1 shows the holding assembly 10 having a camera 40 secured to a ball-joint assembly 15 which in turn is secured to one end of telescopic rod 12. The other end of the support may carry a C-shaped hook 16, which in turn may engage various surfaces, such as the top surface of a board as shown in FIG. 1. As illustrated in FIG. 2, telescopic rod 12 is formed of telescoping segments 12a, 12b . . . 12n which may be locked in various length positions. The telescopic rod 12 has first and second ends, each of which is preferably provided with screw threaded apertures which may receive various fasteners, such as a stud carried by the ball-joint assembly 15.

Figure 4:
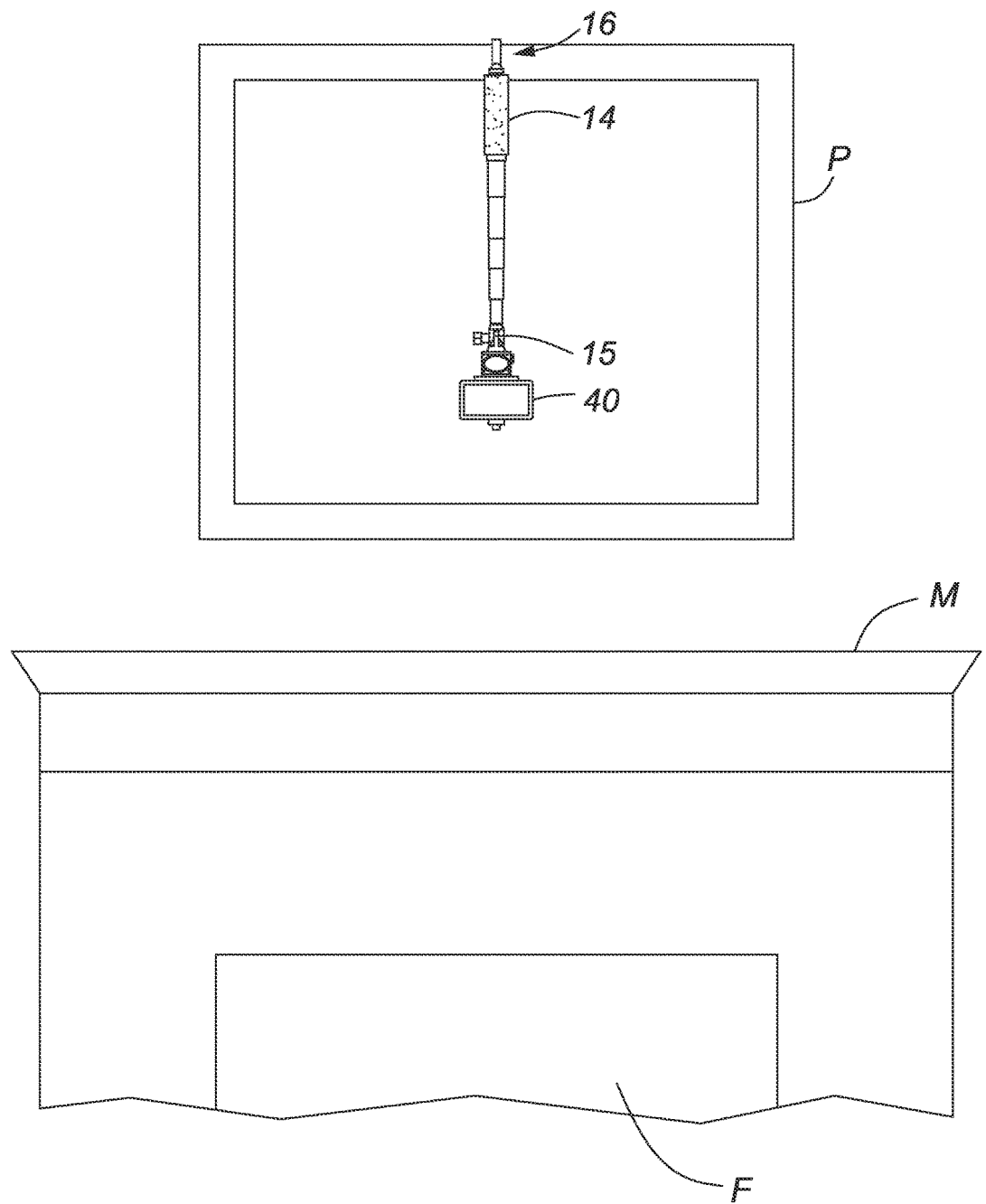
FIG. 4 is a front view showing the holding assembly in an extended position, the holding assembly being hooked to the top of picture frame and being partially extended to position the carried smartphone near eye level.

The ball-joint assembly 15 may be of differing designs, particularly one adapted to receive camera 40 as shown in FIG. 1, or alternatively smartphones as shown in FIGS. 2 and 4. Each ball-joint assembly 15 includes a first portion which is secured to an end of the rigid support as for example via a stud which is received in a threaded aperture at the end of the rigid support. The ball-joint assembly is also provided with a second portion which may be locked in various positions of adjustment via knob 22. The second portion is provided with a mirror 20 so the user can see what the camera or smartphone will capture as an image.

FIG. 2 shows the manner in which the support for a picture taking device can be mounted on a relatively flat surface. In this view, elongated lower contact surface 16e engages to top surface of a brick in a brick wall. While not shown, elongated lower contact surface 16e may engage a variety of other surfaces, such as tree bark, wall and car moldings, etc.

Figure 5:
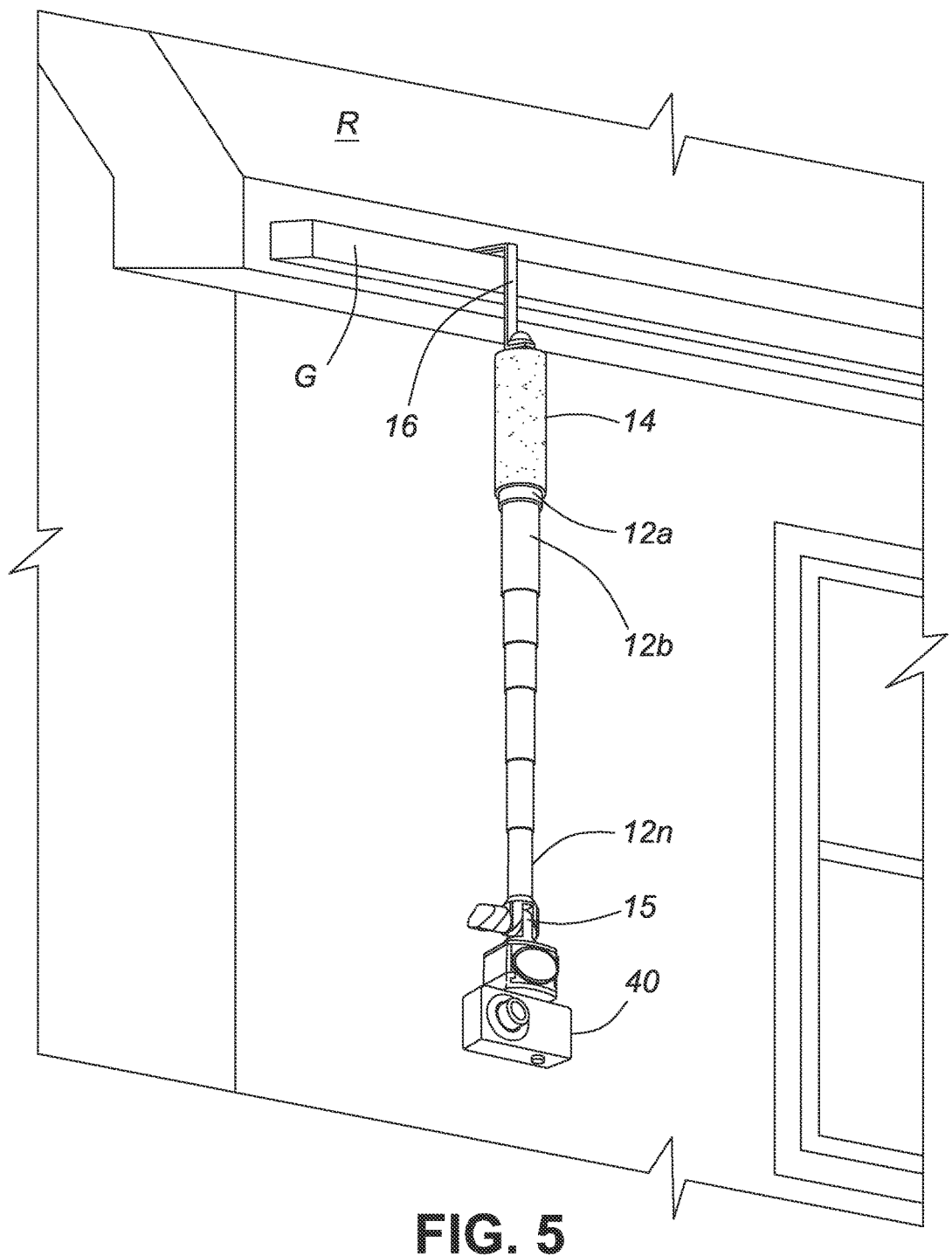
FIG. 5 is a perspective view showing the holding assembly hooked to a rain gutter and being extended to such a length that the picture taking device is at about eye level.

FIG. 4 shows the C-shaped hook 16 engaging the top of a picture frame "P" which may above a mantle "M" over a fireplace "F". In FIG. 5, C-shaped hook 16 is shown engaging a gutter "G" below a roof "R".

Figure 6:
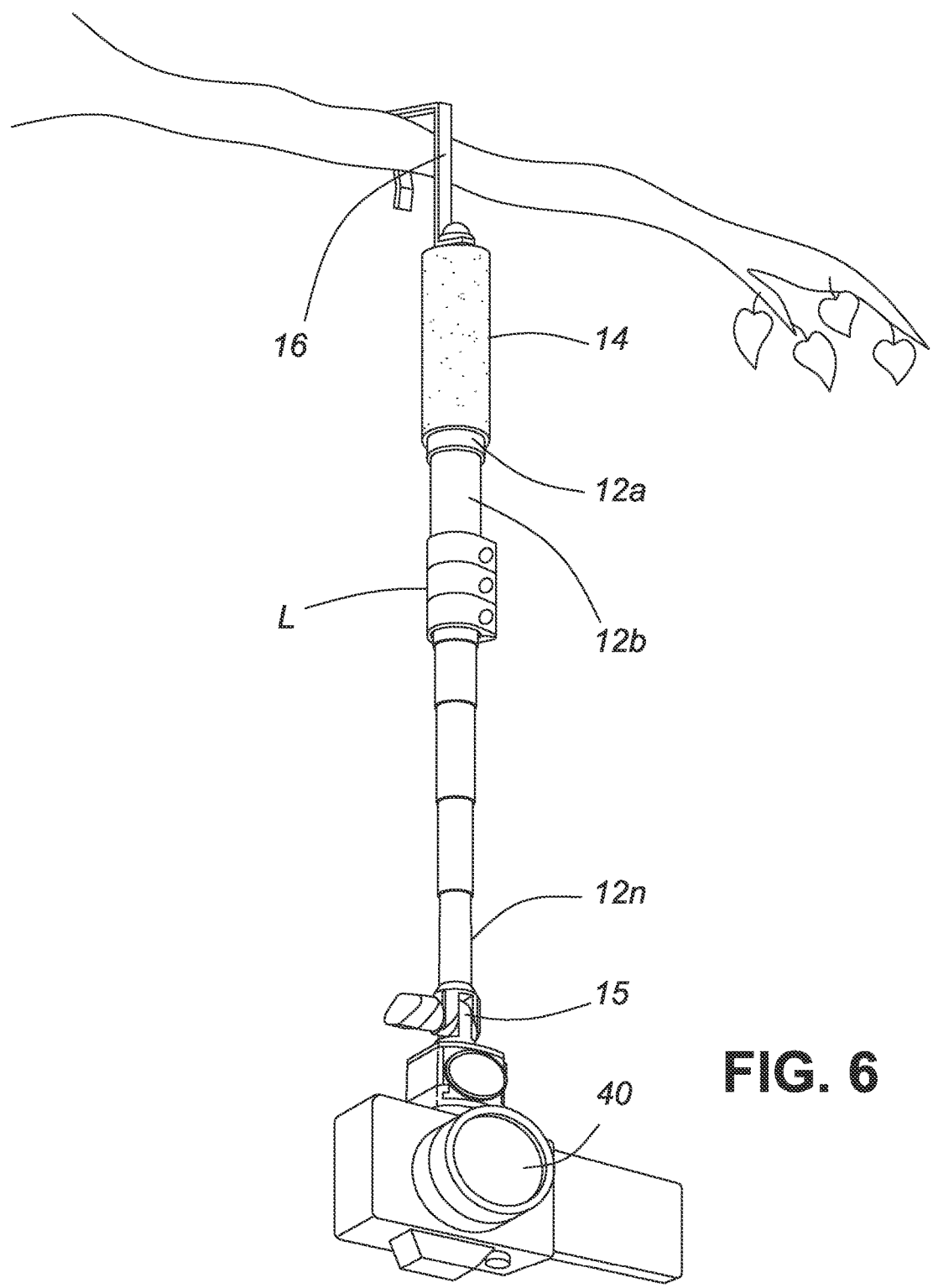
FIG. 6 is a perspective view showing the holding assembly attached to a tree branch; the holding assembly including an adjustable telescopic rod.

FIG. 6 shows a holding assembly where the telescopic rod 12 with telescopic units 12a, 12b . . . 12n has latches "L" which are used to secure the telescopic units 12a, 12b . . . 12n from sliding. This variation is desired when using a heavy picture taking device such as a DSLR.

Figure 7:
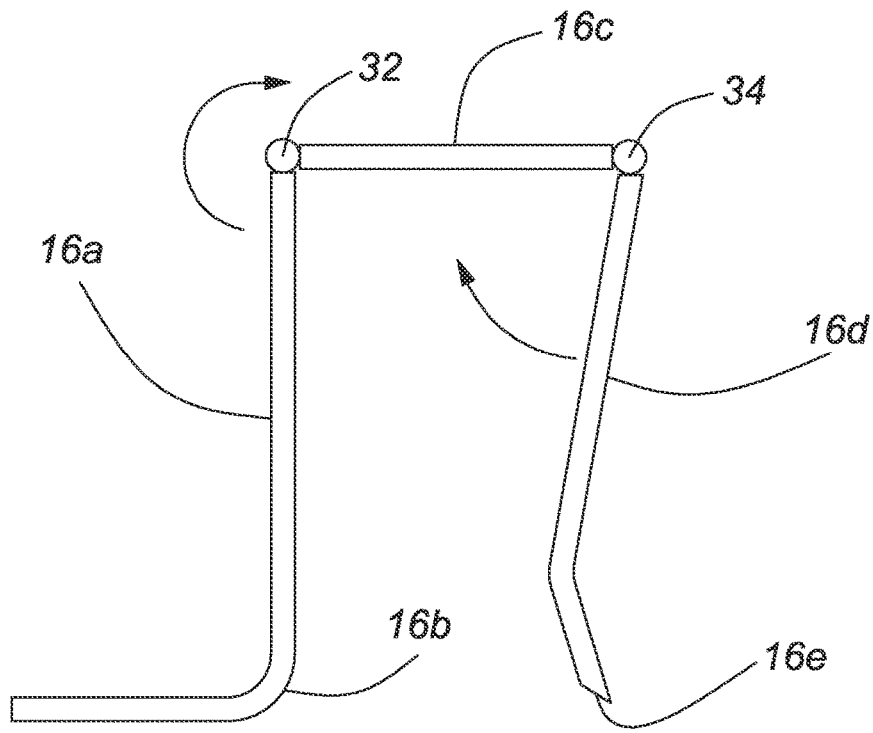
FIG. 7 is a side view showing a variation of the suspension structure where hinges are provided to permit the suspension structure to be folded.
Figure 8:
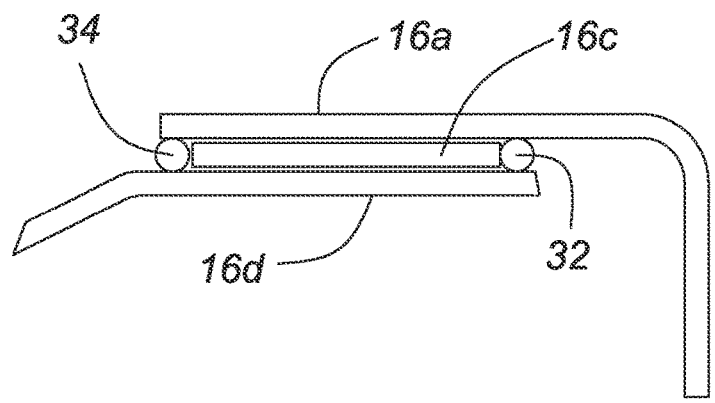
FIG. 8 is a side view showing the suspension structure in a fully folded condition.

One embodiment of C-shaped hook 16, as shown in FIGS. 7 and 8, will have hinges to allow the hook to fold for transport. Thus there will be a first hinge 32 between sections 16a and 16c, and a second hinge 34 between sections 16c and 16d. To fold the C-shaped hook 16 for transport, section 16a will initially be folded onto section 16c, and then section 16d will be folded under section 16c as shown in FIG. 8.

Figure 9:
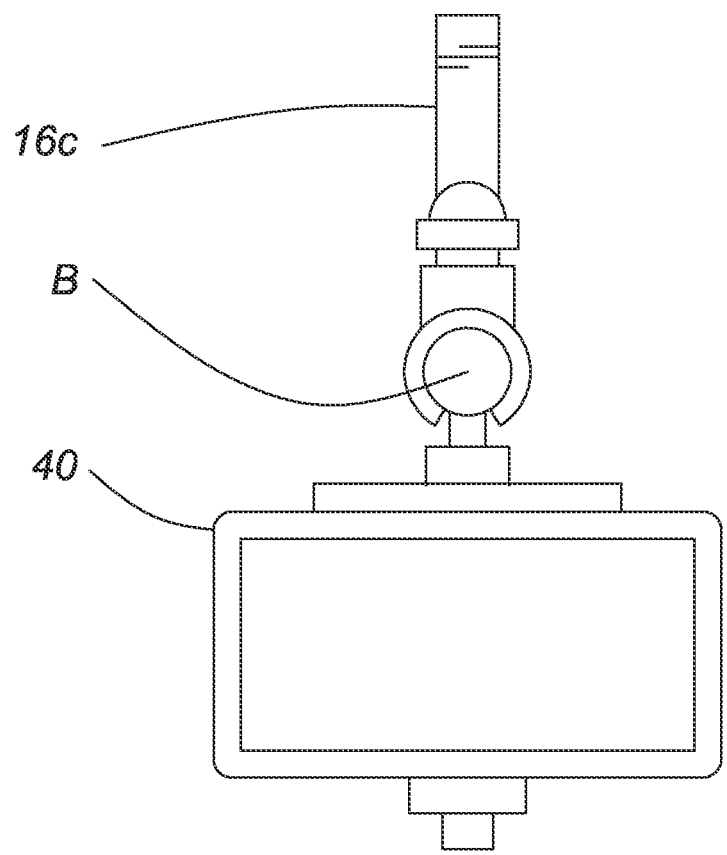
FIG. 9 is a front view showing the various parts of the holding assembly without the rigid rod-like support and the upper ball-joint assembly.

The holding assembly 10 can further be used to provide near instantaneous mounting, without damage to any surface, of a camera 40 for surveillance and/or monitoring of an area or for personal viewing of a video, such as one might do on a train, by mounting the apparatus on the back of the seat in front of the person using it. This feature is shown in FIG. 9 which, to a certain extent, corresponds to FIG. 2, except that, in FIG. 9, there is no requirement for the rigid support to have and adjustable length, nor is there a requirement for the upper ball-joint assembly 15.

Figure 10:
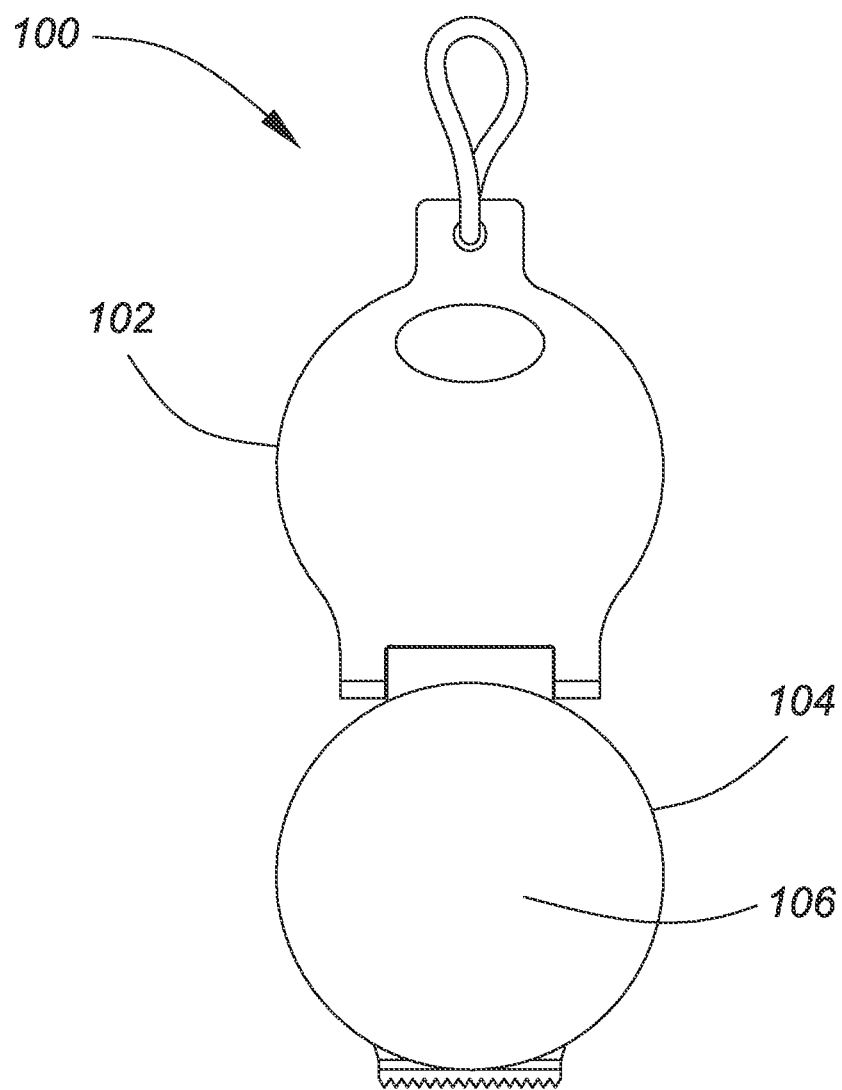
FIG. 10 is a front view of one embodiment of holding assembly having two sections that fold into an open position.

FIG. 10 shows an alternative embodiment of the present disclosure, wherein the holding assembly 100 has two sections, a camera attachment section 102 and a support attachment section 104. From the view in FIG. 10, camera attachment surface 106 is visible, whereas the support attachment surface 142 (shown in FIG. 14) is facing away from the viewer in FIG. 10. The support attachment surface 142 is on the opposite side of holding assembly 100 when in the open position, and can be seen in FIG. 14, where the two panels are separated along hinge 140. The hinge 140 may allow the two sections to rotate away from each other beyond 180 degrees to allow for attachment to a wide variety of surfaces, while having the camera remain vertically positioned.

Figure 11:
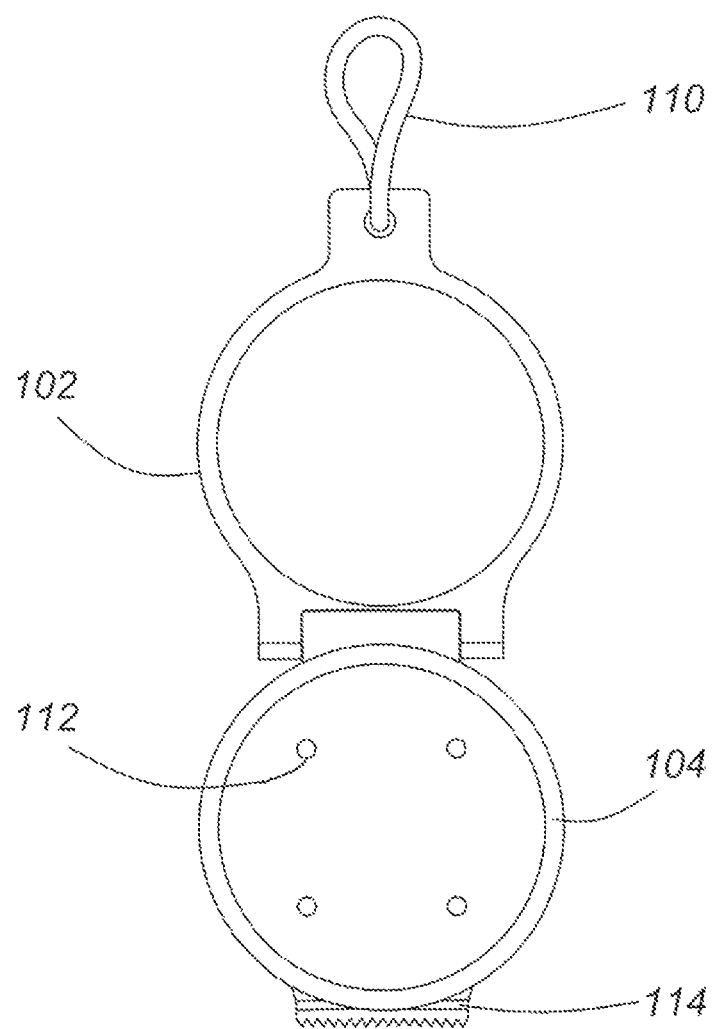
FIG. 11 is a cross sectional front view of the holding assembly in an open position.

FIG. 11 shows a post for screw holes 112 and rigid serrated grip 114. Rigid serrated grip 114 provides a significant advantage, in terms of holding power and stability, when combined with the adhesive means of attachment on the support attachment surface 142. Rigid serrated grip 114, in the preferred embodiment, extends below the camera attachment section 104 and curves toward a support on the support side of camera attachment section 104, extending beyond the vertical plane of the support side of camera attachment section 104 and gripping the support with teeth 116, shown in FIG. 12, at its lower end.

Figure 20A:
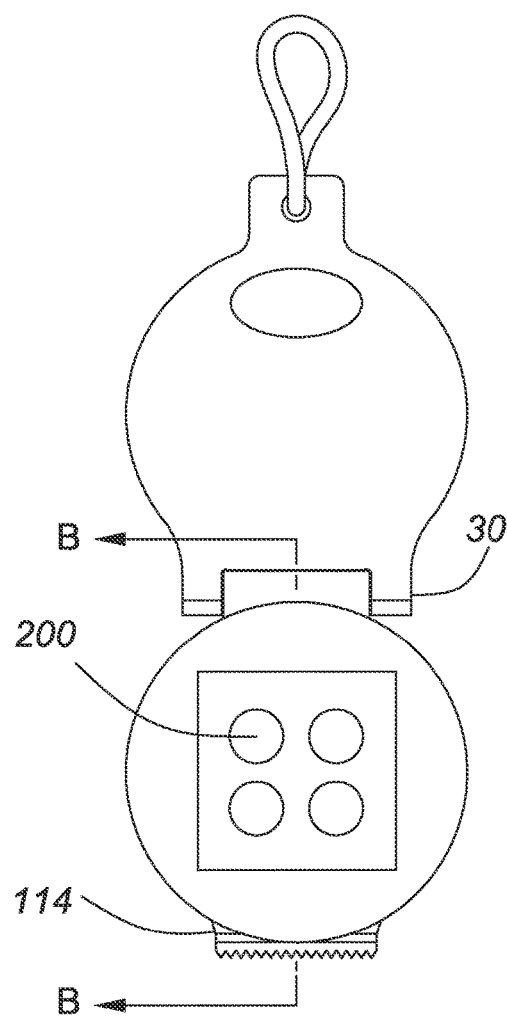
FIG. 20A shows a cross-sectional front view of one embodiment of the holding assembly illustrating the magnets in the camera attachment panel.
Figure 20B:
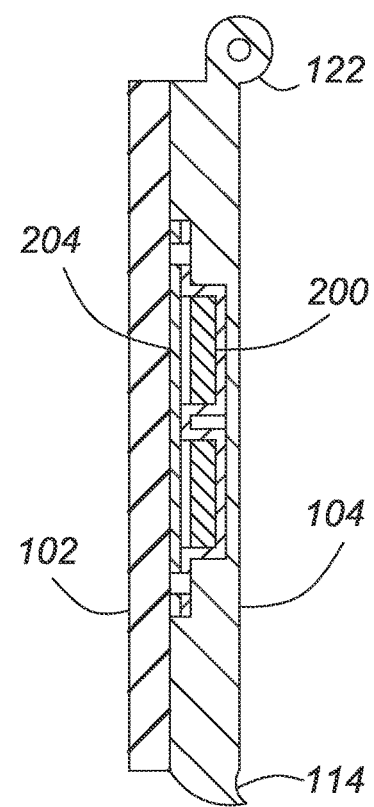
FIG. 20B shows a cross-sectional side view of one embodiment of the holding assembly illustrating the magnets in the camera attachment panel.

The teeth 116 of rigid serrated grip 114 contact the support and may form an angle of approximately 90 degrees with the support, as illustrated in FIG. 20b, although this angle may vary in some embodiments. The angle formed between the teeth 116 and the region of the support directly above the teeth 116 will generally be between approximately 10 and 90 degrees, such that the teeth 116 may grip the support to provide additional holding power to holding assembly 100.

Figure 12:
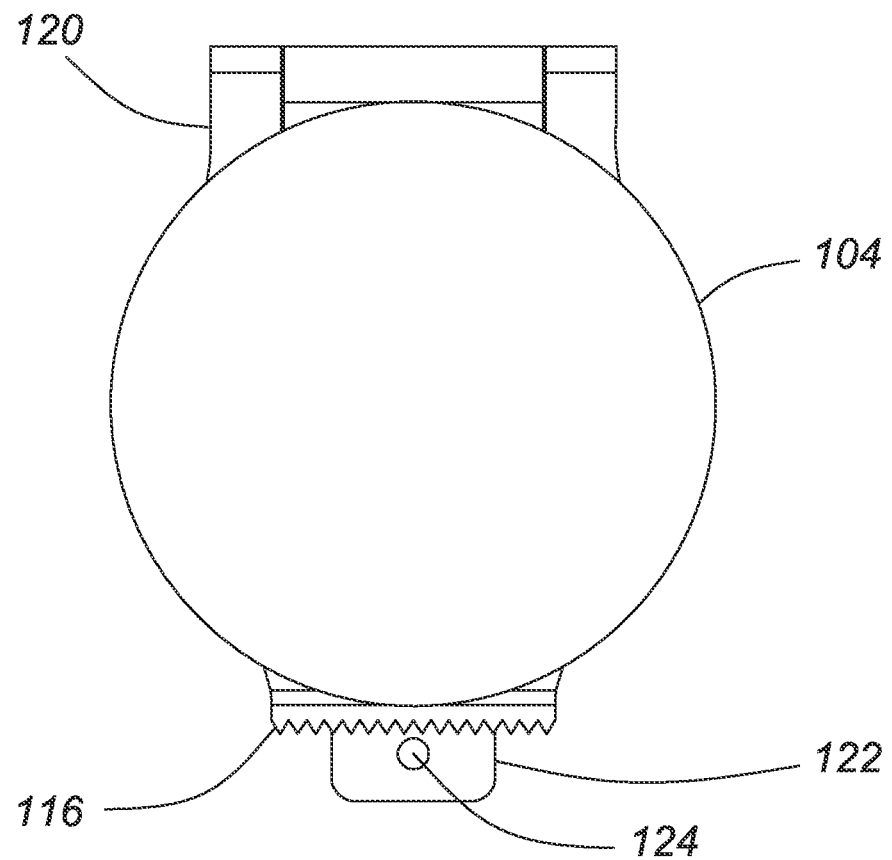
FIG. 12 is front view of the holding assembly in a closed position.

FIG. 12 shows a front view of holding assembly 100 when in the closed position. A tab 122 is included having an aperture 124 to accept additional means attaching holding assembly 100 to a support, such as tether 110. Teeth 116 are shown attached to the lower portion of camera attachment section 104 for gripping a support.

Figure 13:
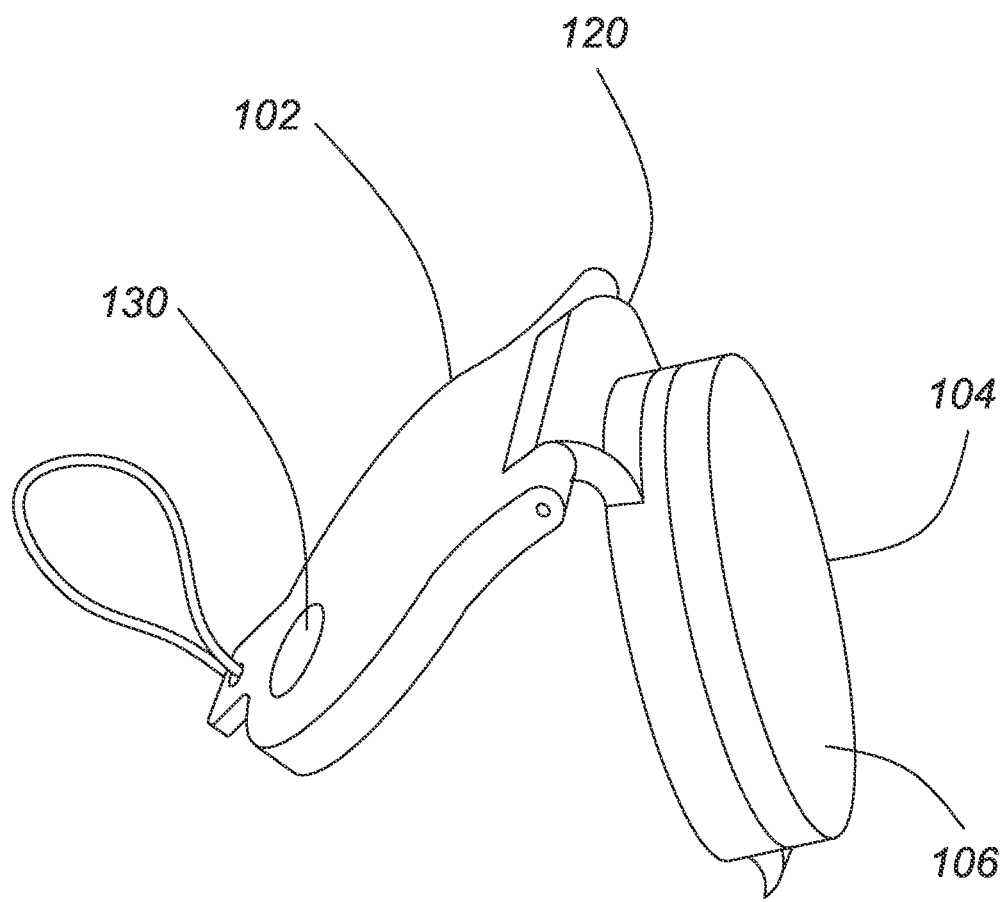
FIG. 13 is a perspective side view of the holding assembly in a partially-open position.
Figure 14:
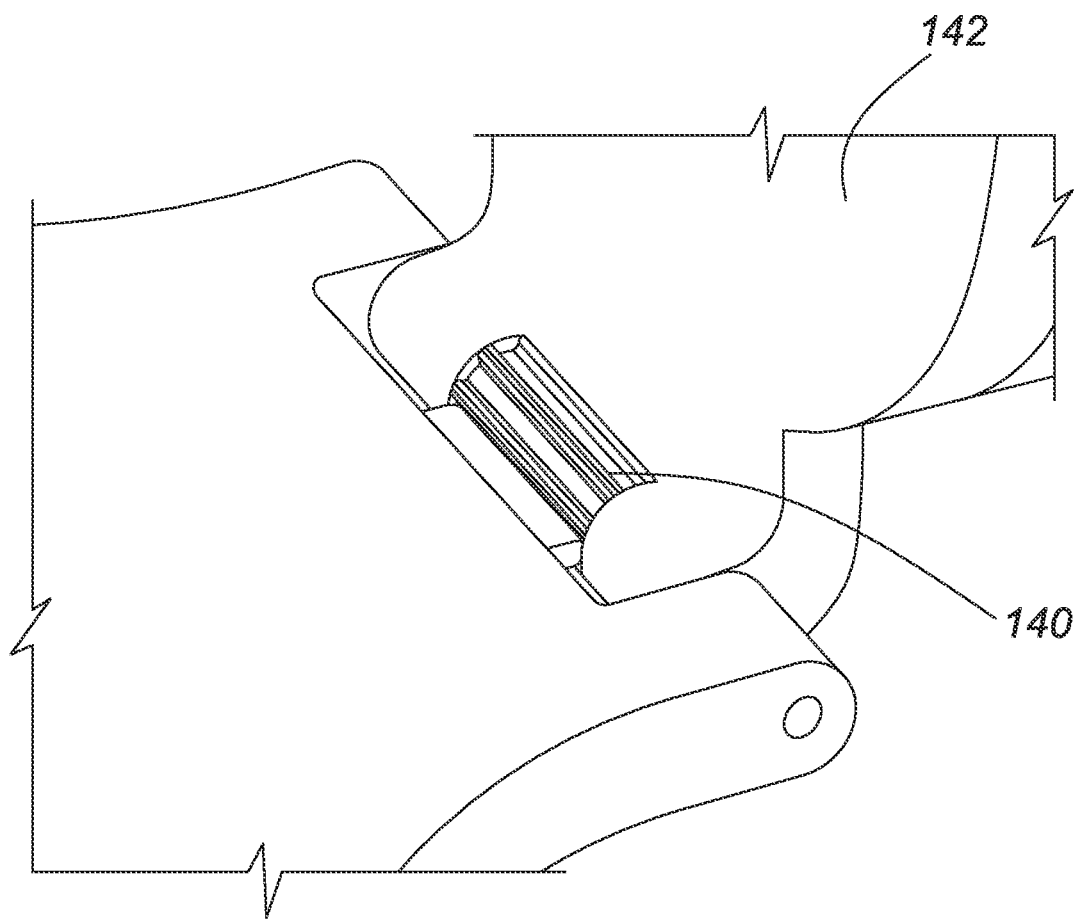
FIG. 14 is a magnified perspective view of the hinge of the holding assembly.

FIG. 13 shows a convex mirror 130. The mirror 130 may be of various shapes and sizes. FIG. 14 shows a hinge 140 having a hinge rod, which in alternative embodiments may be a ball-joint type hinge, for opening the holding assembly 100. Support attachment surface 142 is shown. The support attachment surface 142 may be an adhesive in the preferred embodiment. The adhesive is preferably washable and will not leave a significant residue on the support or camera. The adhesive may be GK-22, produced by Northstar Polymers.

Figure 15:
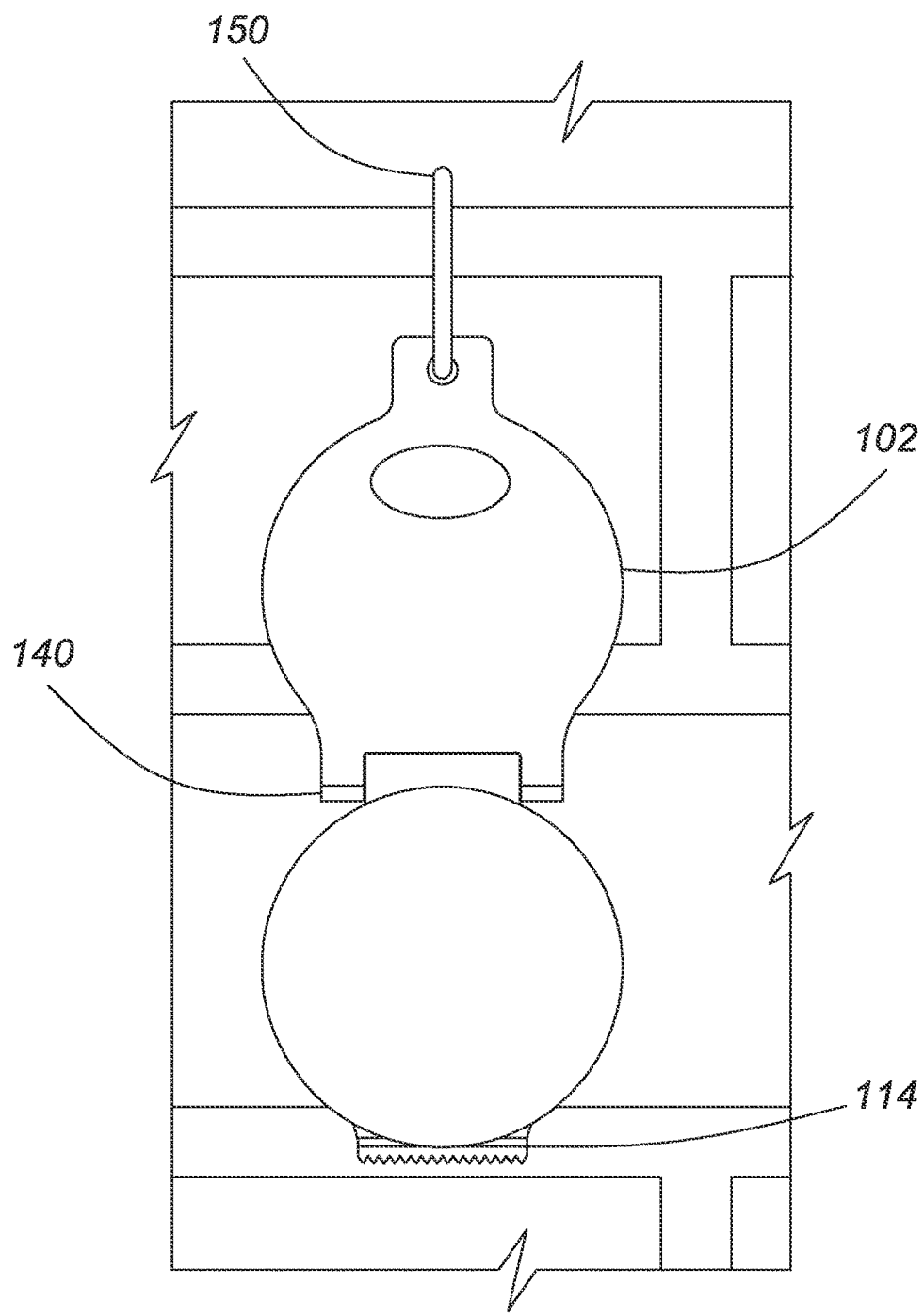
FIG. 15 is a front view of the holding assembly with a hook.
Figure 16:
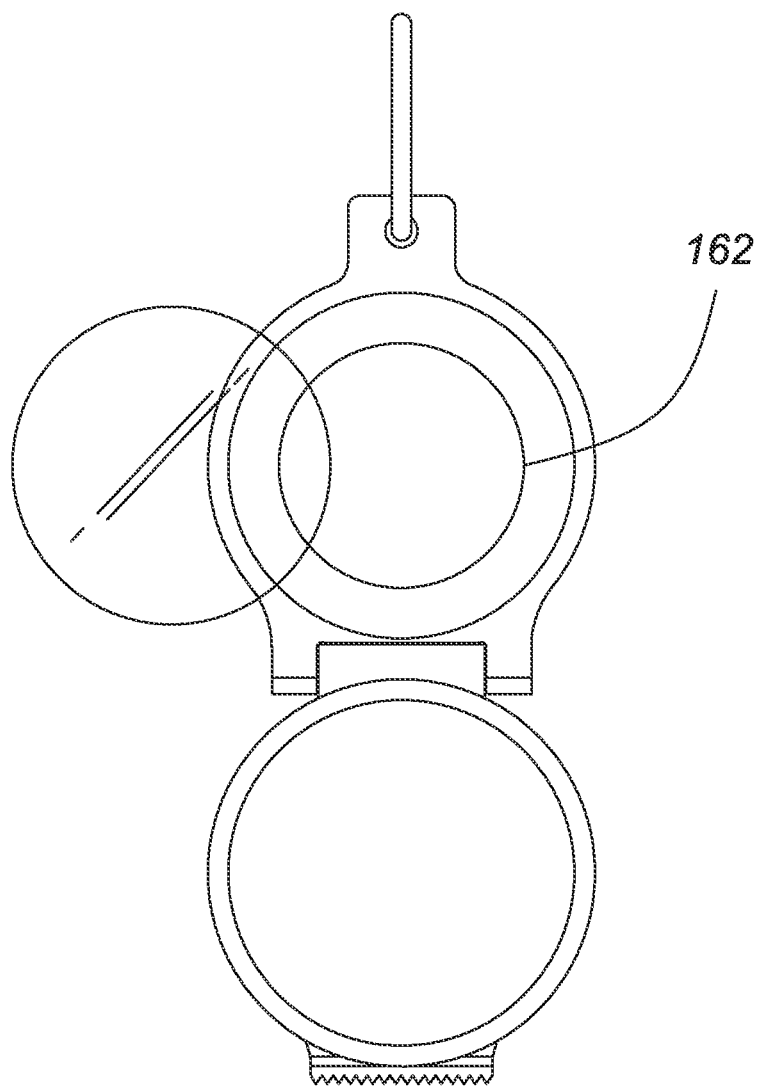
FIG. 16 is a front view of a partially assembled holding assembly.
Figure 17:
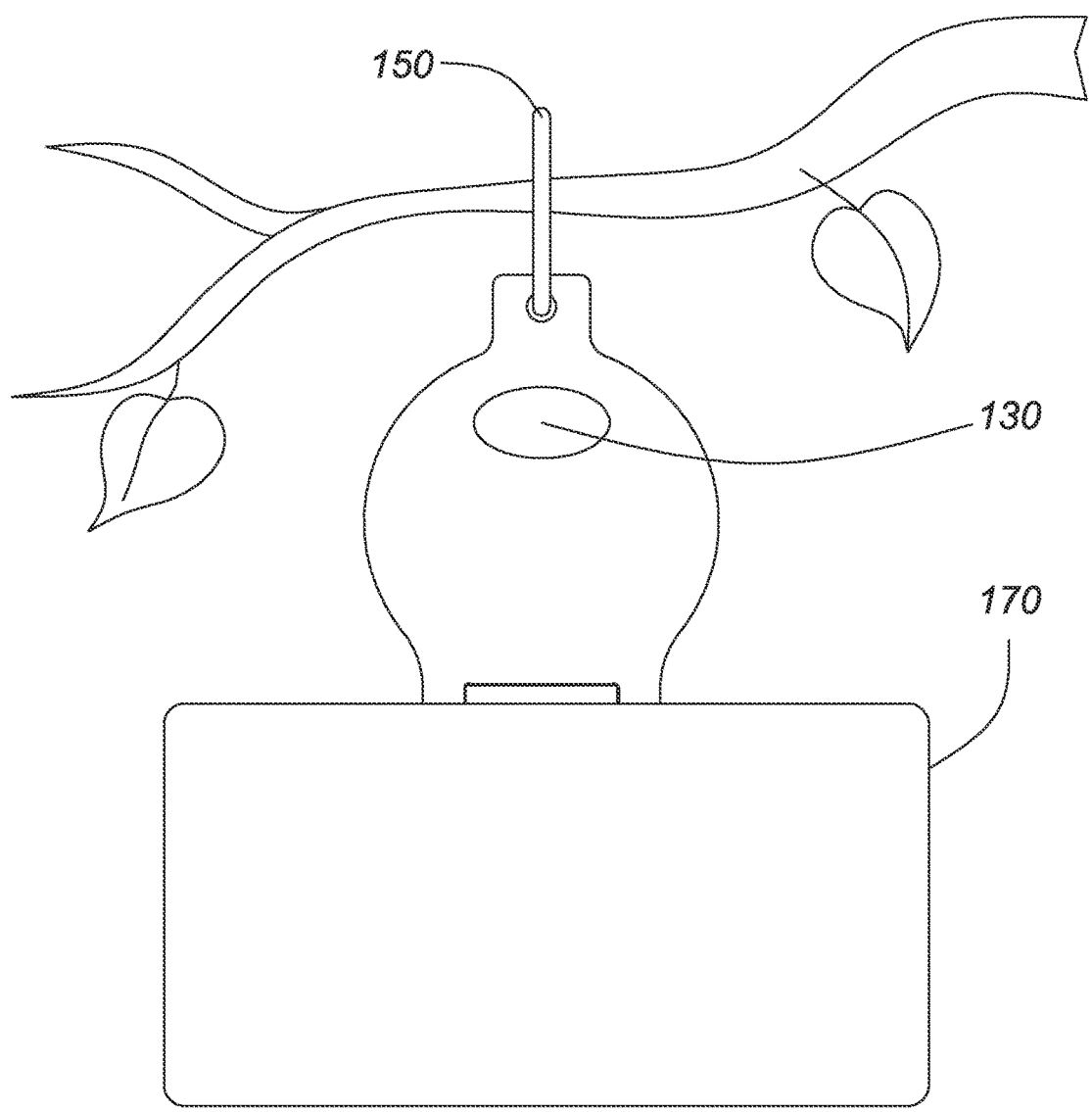
FIG. 17 is a front view of the holding assembly with a camera horizontally attached.
Figure 18:
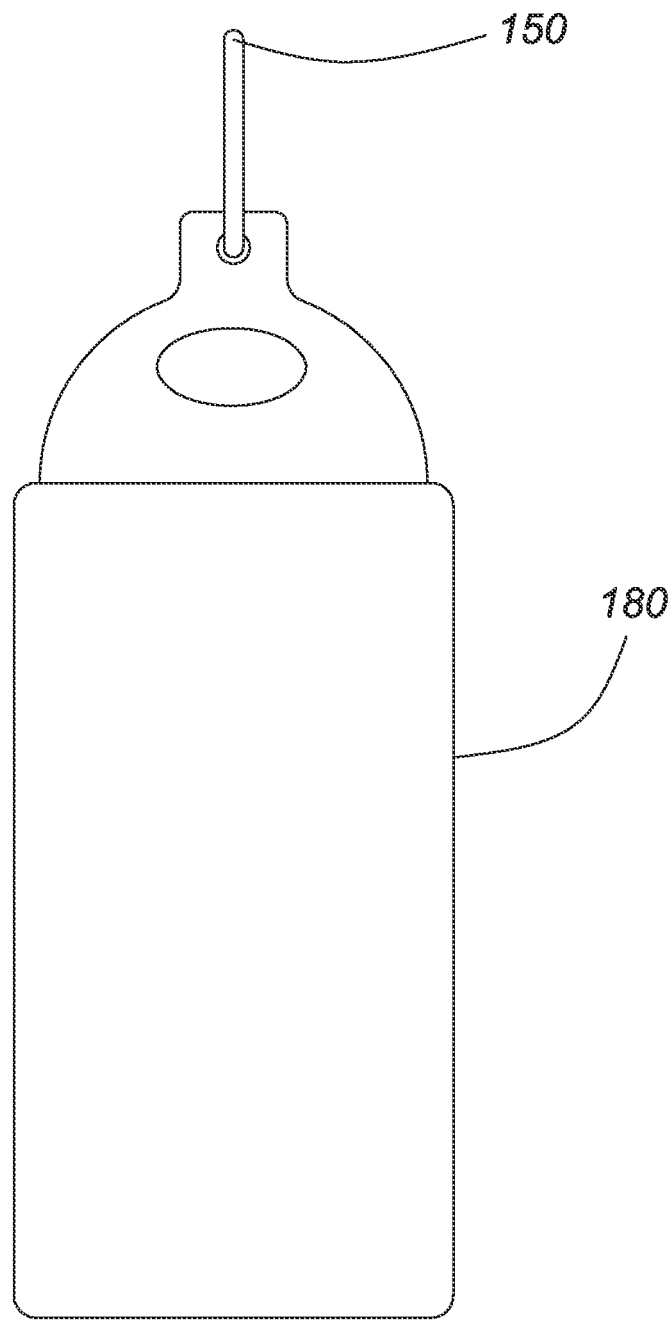
FIG. 18 is a front view of the holding assembly with a camera vertically attached.
Figure 19:
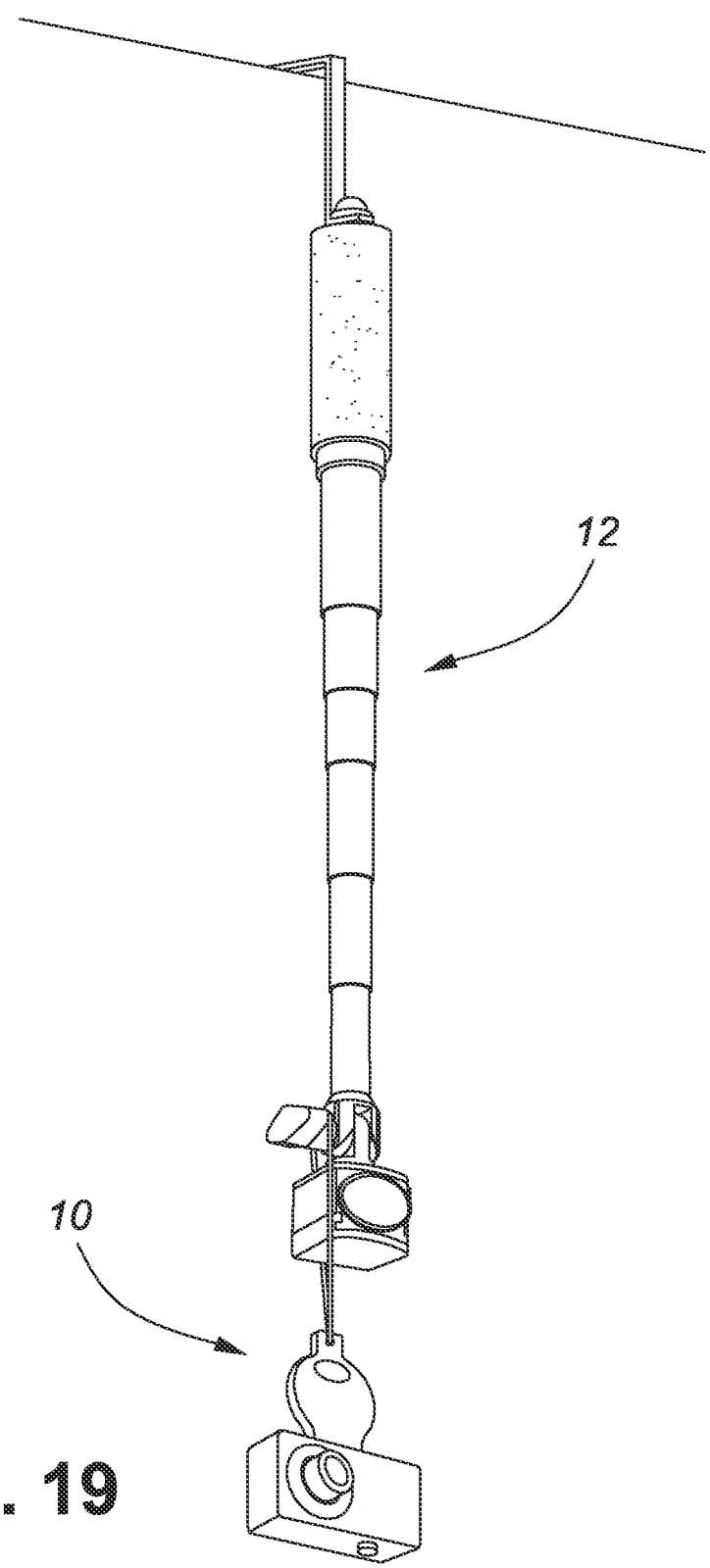
FIG. 19 is a perspective view of the holding assembly with a telescopic rod attached to the panels by a tether.

FIG. 15 illustrates a J-hook 150 connected to holding assembly 100 through aperture 124. FIG. 16 shows cover plate 162. FIG. 17 shows convex mirror 130 and the J-hook 150 supporting holding assembly 100 through attachment to a tree branch. Horizontal camera 170, which may be a smartphone, is attached to the camera attachment surface 106. FIG. 18 shows vertical camera 180 and J-hook 150. FIG. 19 shows a holding assembly 110 combined with telescopic rod 12 attached to a flat support.

Figure 21:
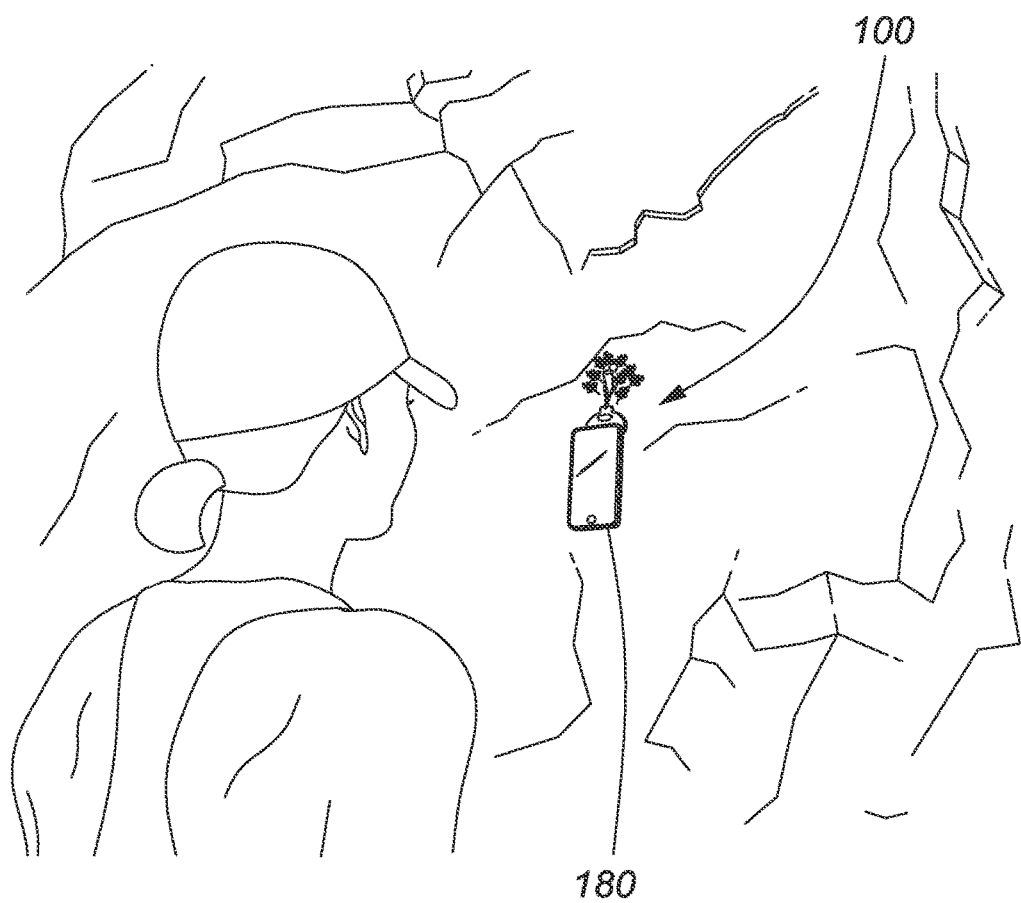
FIG. 21 shows a perspective view of the holding assembly attached to an uneven support surface.

FIG. 20a shows an embodiment of the present disclosure having a plurality of magnets 200 in the camera attachment section 104. The magnets 200 allow attachment of a camera 40, which may be a smartphone, to the camera attachment surface 106 without the use of adhesives or other means of attachment. Alternatively adhesives and other means of attachment may be used in combination with magnets 200. FIG. 20b illustrates a side cross-sectional view of holding assembly 100 showing magnets 200 along with cover plate 204. FIG. 20b provides a side view of rigid serrated grip 114, which adds stability to holding assembly 10 when in use. Additionally, tab 122 can be seen in FIG. 20b. FIG. 21 shows holding assembly 100 attached to an uneven surface, such as a mountainside, for support. Vertical camera 180 is attached to the holding assembly 100.

While preferred embodiments of this disclosure has been described above and shown in the accompanying drawings, it should be understood that applicant does not intend to be limited to the particular details described above and illustrated in the accompanying drawings, but intends to be limited only to the scope of the disclosure as defined by the following claims. In this regard, the term "configured" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A holding assembly, comprising:
a camera attachment section having a camera attachment surface and a support attachment section having a support attachment surface; wherein the camera attachment section and the support attachment section are connected by a hinge; a generally horizontal rigid serrated grip having a plurality of teeth attached to the camera attachment section wherein the teeth are configured to contact the support below the support attachment section; wherein the camera attachment section includes at least one magnet behind the support attachment surface for holding the camera to the holding assembly.

2. The holding assembly of claim 1 wherein the support attachment surface is an adhesive.

3. The holding assembly of claim 1 wherein the teeth are configured to contact the support below the camera attachment section.

4. The holding assembly of claim 1 wherein the support attachment surface is a reusable, removable and washable adhesive portion.

5. The holding assembly of claim 1 wherein camera attachment section and the support attachment section are configured to fold together.

6. The holding assembly of claim 1 wherein the hinge allows for approximately a 360 degree rotation between the camera attachment section and the support attachment section.

7. The holding assembly of claim 1 wherein an angle formed between an upper surface the teeth and the support is approximately 90 degrees.

8. The holding assembly of claim 1 wherein an angle formed between an upper surface of the teeth and the support is in a range of between approximately 45 degrees and 90 degrees.

9. The holding assembly of claim 1 wherein the rigid serrated grip is located horizontally central on the camera attachment section and extends at least approximately 25 percent of the width of the camera.

10. A holding assembly, comprising:
a camera attachment section having a camera attachment surface and a support attachment section having a support attachment surface; wherein the camera attachment section and the support attachment section are connected by a hinge; a generally horizontal rigid serrated grip having a plurality of teeth attached to the camera attachment section wherein the teeth are configured to contact the support below the support attachment section; and a convex mirror located on a front side of the support attachment section opposite the support attachment surface.

* * * * *